United States Patent

Gardner et al.

Patent Number: 5,535,542
Date of Patent: Jul. 16, 1996

[54] CONTAINER FOR THE PURPOSE OF HUMIDIFYING VESSELS OF FLOWERS AND PLANTS AND VESSELS CAPABLE OF HUMIDIFYING FLOWERS AND OR PLANTS

[76] Inventors: Terry L. Gardner, Villaggio Monte Grappa, Via Dante 36/A, Quinto Vicentino (Vicenza), Italy; Remigio Perazzolo, Via Ferrarin 34, Olmo di Creazzo (Vicenza), Italy; Peter J. Grillo, Via S. Antonio 100, Villaverla (Vicenza), Italy; Earnest L. Wilson, 106 Yorkloop, Shreve Port, La. 71109

[21] Appl. No.: 226,285

[22] Filed: Apr. 11, 1994

[30] Foreign Application Priority Data

Apr. 13, 1993 [IT] Italy .................. VI93A0055
Oct. 5, 1993 [IT] Italy .................. VI930078 U

[51] Int. Cl.[6] .............................. A01G 31/02; A01G 9/24
[52] U.S. Cl. .................................................. 47/18; 47/81
[58] Field of Search .......................... 47/18 R, 81, 81 N, 47/81 D, 60 M, 18, 79 N, 79 D

[56] References Cited

U.S. PATENT DOCUMENTS

| 1,247,766 | 11/1917 | White | 47/81 |
|---|---|---|---|
| 3,534,498 | 10/1970 | Herrli | 47/81 |
| 3,898,766 | 8/1975 | Goldstaub | 47/81 |
| 4,226,048 | 10/1980 | Molnar | 47/81 |
| 5,047,197 | 8/1991 | Pope | 47/79 D |
| 5,058,319 | 10/1991 | Liao | 47/81 |

FOREIGN PATENT DOCUMENTS

| 1771402 | 10/1992 | U.S.S.R. | 47/18 R |
|---|---|---|---|
| 1039188 | 8/1966 | United Kingdom | 47/60 NL |
| 1098155 | 1/1968 | United Kingdom | 47/81 |
| 81/01495 | 6/1981 | WIPO | 47/18 |

Primary Examiner—Henry E. Raduazo
Attorney, Agent, or Firm—Bucknam and Archer

[57] ABSTRACT

A container (1) made for instance of ceramic, terracotta, or plastic material, is capable of supporting conventional vessels (4) by means of a plate (3) which is provided with openings. The vessels have a top peripheral border (5) which protrudes with respect to the peripheral border of the container so that the vessels are raised from the bottom of the container. Water is placed at the bottom of the container, some strips of felt (9) or similar absorbing material is inserted into the vessel and reaches the bottom of the container so that water is transferred to the soil by capillary action and also by evaporation. The containers consist of three compartments; the upper compartment corresponding to the vessel which contains the soil (7), the lower compartment (6) containing the water, and an intermediate compartment (24) forming an air chamber. The walls (the container (1), the plate (3), and the vessel(s) [4]) form the air chamber (24) and act as an evaporation barrier. As water evaporates from the reservoir (6) it condenses along the walls containing the air chamber (24). Water is thereby reclaimed by the reservoir or is absorbed by the soil in the upper chamber (7).

5 Claims, 3 Drawing Sheets

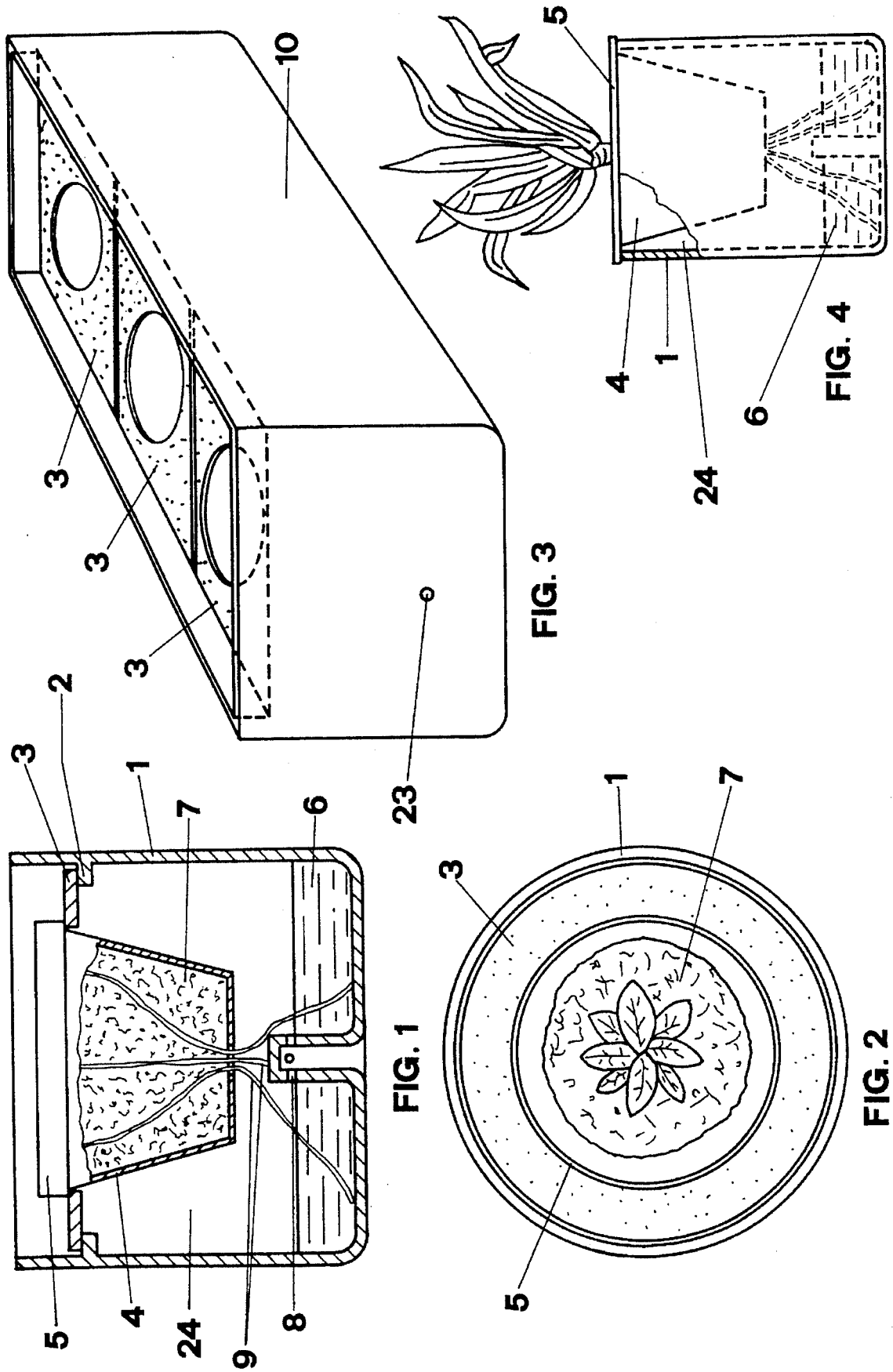

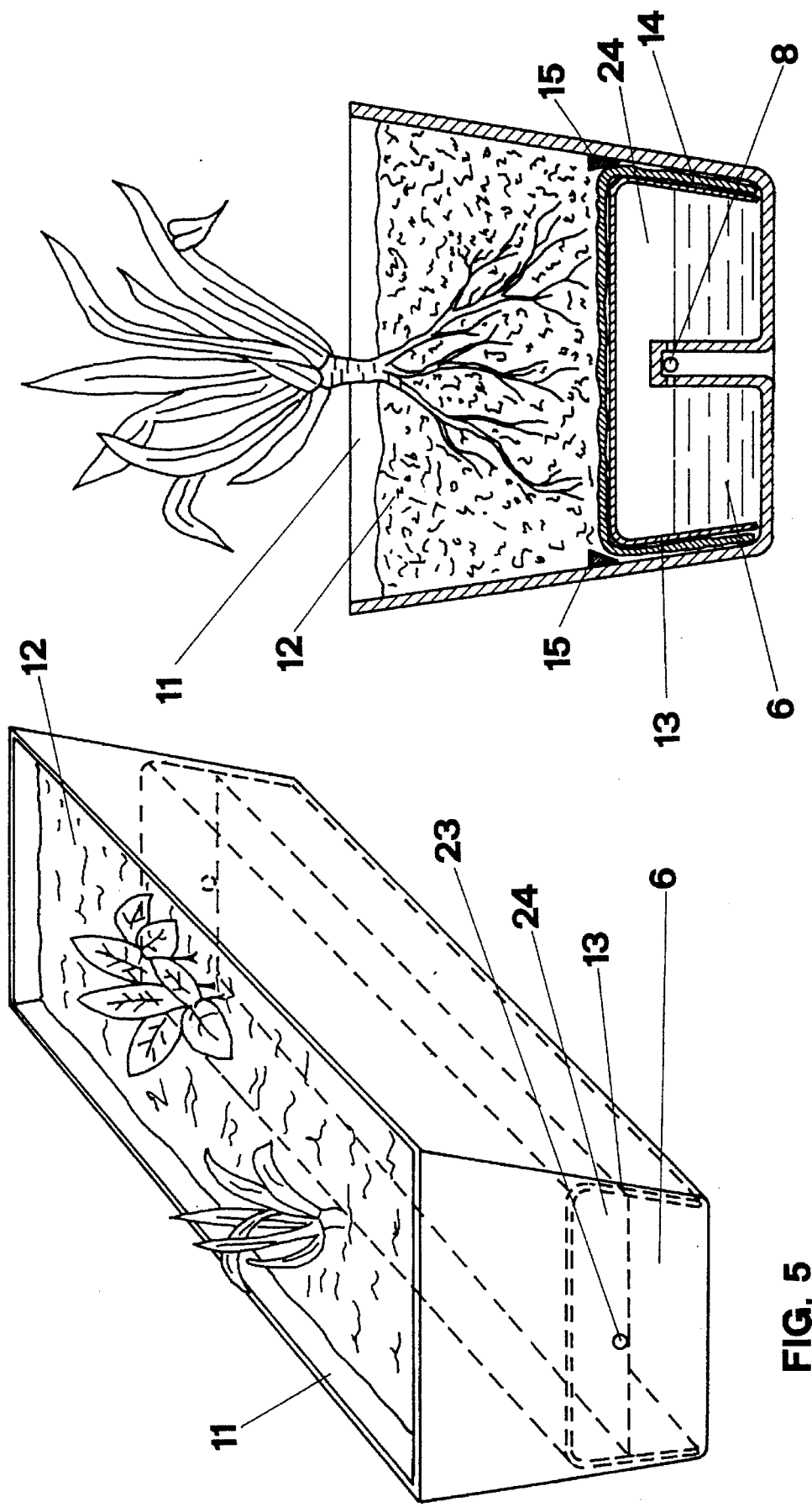

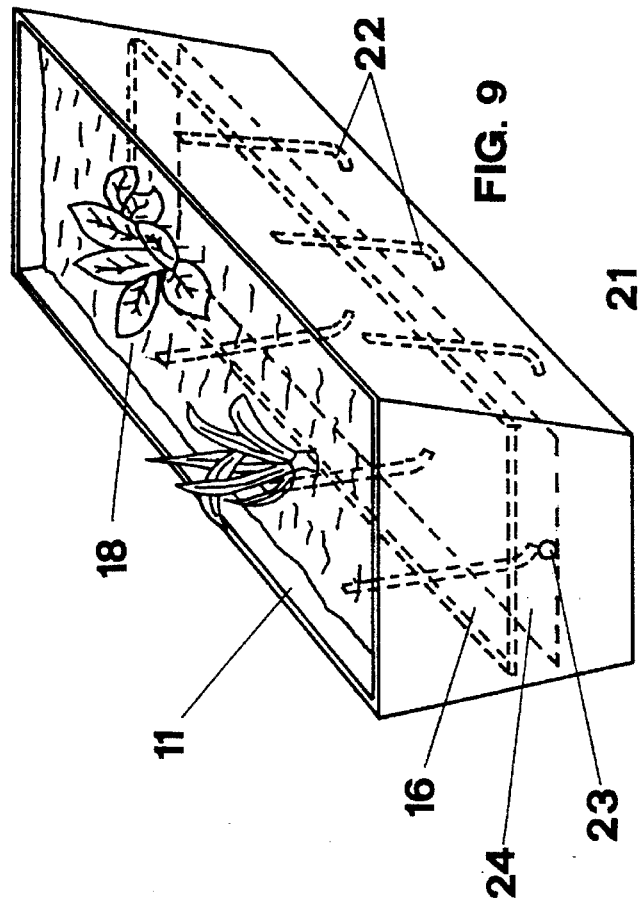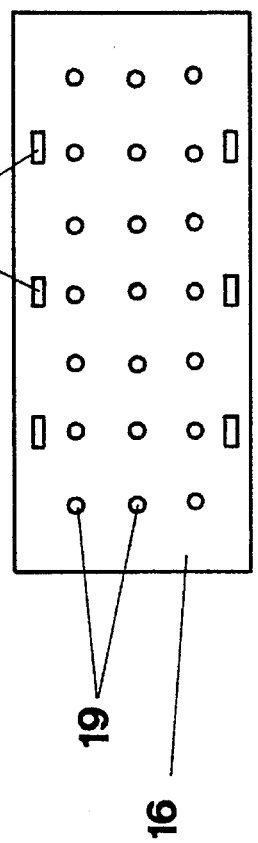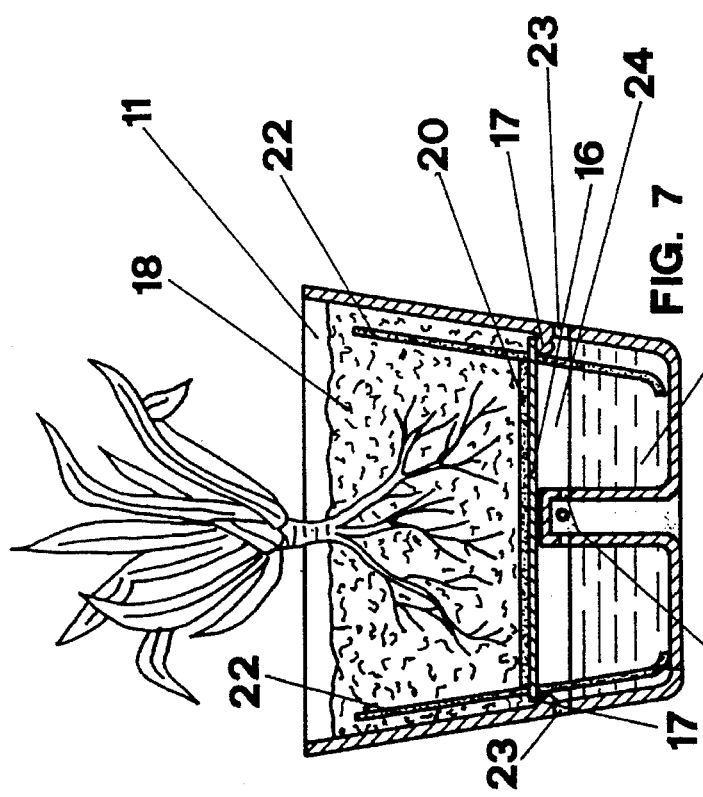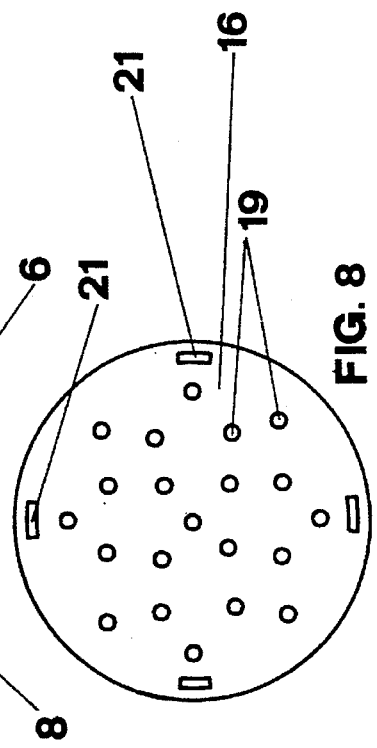

CONTAINER FOR THE PURPOSE OF HUMIDIFYING VESSELS OF FLOWERS AND PLANTS AND VESSELS CAPABLE OF HUMIDIFYING FLOWERS AND OR PLANTS

FIELD OF THE INVENTION

The present invention relates to containers for watering flowers and plants.

SUMMARY OF THE INVENTION

The container according to the present invention for watering flowers and plants, permits to maintain moist one or more vessels containing flowers or plants which are supported within the container by means of strips for instance of felt which gradually transmit due to capillary action the quantity of water exactly requested by the flowers and plants which are located within the respective vessels through the soil contained in the vessels placed above the water.

A feature of the container according to the present invention resides in the fact that it permits to support one or more vessels for flowers, the bottom of the vessel remaining raised with respect to the bottom of the container so that the water introduced into the container for humidifying the soil in the vessels remains always below the bottom of the vessels thus avoiding the possibility that roots rot by contact with water.

Another fundamental feature of the invention resides in the means for automatic feeding of the water used for humidifying the soil. The strips are inserted within the mass of the soil of the vessels and are immersed in the lower part in the water of the container until the water is completely consumed.

Still another feature of the container is an insulating humidifying air chamber. As water evaporates from the reservoir, it is contained by the walls of the air chamber (evaporation barrier). The air chamber provides air and water (humidity) to the upper chamber containing the soil. The air chamber also insulates the interior vessel from external environmental temperature extremes.

According to another embodiment of the invention, a vessel for flowers or plants comprises in the interior a peripheral rib on which a plate rests, the plate having openings and dividing the vessel in three compartments of which the upper compartment is intended to contain the soil, the lower compartment contains the water being used as a reserve, and an intermediate compartment forming an air chamber for the gradual humidification of the soil located above the water.

The invention is further illustrated by reference to the accompanying drawings of which:

FIG. 1 is a cross section of the container with a single vessel therein;

FIG. 2 is an upper planar view of the same container which for instance has a circular shape.

FIG. 3 illustrates a container of length greater than the width suitable for placing therein several vessels.

FIG. 4 is a modification of the embodiment of FIG. 1 and shows a vessel with a protruding peripheral border which rests directly on the border of the container which contains water.

FIG. 5 illustrates an embodiment of the invention for containing soil humidified according to the present invention.

FIG. 6 is a cross section of the container of FIG. 5.

FIG. 7 illustrates in cross section the embodiment of a circular vessel having inserted therein a separating circular plate.

FIG. 8 is a planar view of the circular plate of FIG. 7 having openings.

FIG. 9 is a perspective view of a vessel of rectangular shape.

FIG. 10 is a planar view of the plate having openings in the vessel of FIG. 9.

As shown by way of a non-limited example in FIGS. 1 and 2, the container consists of a cylindrical body (1) of a diameter capable of containing the vessel of flowers or plants to be humidified. This container has in the upper part a border (2) on which plate (3) rests. Plate (3) has a central opening capable of containing the vessel (4) which is inserted in the central opening up to its peripheral border which has a diameter (5) greater than the opening.

By substitution of the plate (3) with other plates having openings of different diameters, the same container (1) may be used to contain vessels of diameter either more or less, thus permitting the use of the same container with great flexibility.

Vessel (4) when it is inserted within the plate (3) remains raised with respect to the bottom of the container (1) while water (6) is placed on the bottom of the container for the humidification of the soil (7) contained in the vessel. In order to avoid that the level of water rises to touch the bottom of the vessel, the container is provided with a cylindrical tube (8) which serves the function called "troppo pieno" (too full) so that the level of the water remains always fixed to a level lower than the bottom of the vessel.

It is clear that a similar function of eliminating excess water may also be carried out by a lateral opening (23) placed at a suitable point with respect to the bottom of the container.

The openings provided for preventing too much water in the container, are disposed on the cylindrical body (8) and also serve the function of permitting the entry of air into the container for the purpose of recycling the air in the container.

The absorption of water by the soil in the vessel occurs by means of a certain number of strips (9) which are made of felt or other suitable absorbing material and which are inserted through the openings formed in the bottom of the vessel (4). The strips go through the entire amount of the soil contained in the vessel so as to achieve a more effective action of humidification of the soil.

The strip (9) must be immersed in the water (6) to the point of touching the bottom of container (1) so as to allow the water to go up, due to the capillary action, to the time when the water is completely consumed.

It is clear that the initial reserve of water placed in the container may permit a regular humidification of the soil of the vessel also for several days in the absence of human intervention and even in the absence of any individual.

The system of humidification in addition to the fact that it exhibits its action for a substantial period of time, offers the further advantage of being self-regulated because the quantity of water being absorbed by the soil by means of the strips is always proportional to the degree of dryness of the soil itself and therefore the absorption requested by the plant placed in the vessel is always sufficient for the cultivation.

The perfect position of the plate (3) and vessel (4) permits to hold the moisture in the interior of the container (1) thus guaranteeing also a perfect thermic insulation, a fact which permits to maintain a more constant temperature in the interior of the container.

FIG. 3 illustrates another embodiment of the single container described hereinabove. It consists of a container (10) of length greater than its width in which may be inserted one or more plates (3) which may rest along the supporting border, the plates having openings of equal or different diameter depending upon the vessels being inserted. In this manner, one may achieve a convenient and elegant plurality of flower boxes in which the vessels of the flowers are humidified with the system described hereinabove.

Another embodiment of the invention is shown in FIG. 4 in which the vessel for the flowers (4) has a peripheral border (5) of lesser thickness but protruding more with respect to conventional vessels so that the vessel may rest directly on container (1) and remains raised at the proper height from the bottom. With this container it is easier to raise the vessel (4) for the control or the restoration of the level of water (6) because the same vessel has a diameter with a border slightly greater than the border of the container.

A further embodiment of the invention is illustrated in FIGS. 5 and 6. The vessel (11), which may have a different shape and dimensions, is capable of containing the soil (12) humidified with the same system and it may be used to cultivate different flowers and plants. The separation between the soil (12) and the water (6) may be carried out by means of a shaped structure (13) which has for instance the shape of omega as it is better shown in FIG. 6. On top of the structure (13) there is placed a strip (14) of felt or other suitable material and the strip is immersed with its lower part up to the bottom of the container thus accomplishing the humidification of the soil up to the time when there is still water on the bottom of the container.

A pair of strips (15) having a wedge shape may be used as shown in FIG. 6 to prevent the soil from dropping along the internal walls and coming in Contact with the water.

The container or vessel according to the different embodiments always offers a closed compartment in which is placed water to be used for the humidification of the vessels and the soil above the container or vessel. This closed compartment is extremely useful to contain water vapor which condenses in contact with the vessels or the soil so that the vessels when they are made of terracotta, which is porous, or of a plastic material with several openings absorb the water which has condensed and maintains the soil with the proper amount of moisture and at the same time freshens the soil.

The enclosed container offers another advantage because it prevents the growth and proliferation of mosquitoes or other insects which are usually present in stagnant water.

The embodiment according to FIG. 7 utilizes the same means for the humidification of the soil. It comprises three compartments separated by a plate (16) which has openings and which rests for instance on peripheral rib (17) formed by presswork in the interior of the vessel, an air chamber (24) and a water reservoir (6) separated from the air chamber by one or more air holes (23). The vessel (11) may have a trunconical shape or it may have a rectangular shape but tapered at the base for example. The vessels can be made conventionally of terracotta, or other materials including; plastic, granular paste, or cement. If one uses terracotta vessels, the system of waterproofing these vessels may be carried out with a base of silicone and water or other suitable material. These vessels can be made using any shape or form using the three compartments.

The peripheral rib (17) may be substituted by the desired number of lugs for purposes of supporting the plate (16), the lugs resting on the bottom of the vessel.

The upper compartment contains the soil (18) used for the cultivation of plants or flowers, the lower compartment contains the water (6) and the intermediate compartment contains the air chamber (24) that is to be used for the humidification of the soil when the water is introduced from above.

The water may drop through the mass of the soil in the lower compartment in view of the fact that the supporting plate (16) contains a certain number of openings (19) as shown in FIGS. 8 and 10, which openings are distributed in the central part of the plate.

In order to avoid the soil dropping in contact with the water through the same openings, there is provided a piece of felt or similar material (20) as shown in FIG. 7 which allows only the water to reach the lower compartment.

In addition to the same openings, plate (16) comprises other openings (21) which are larger than the openings (19) and which are regularly distributed along the periphery of the plate. Each of openings (21) are intended to let a strip of felt or similar material (22) to go through as shown in FIGS. 7 and 9. This strip permits the humidification by means of water due to capillary action because the strip is immersed in the water and the water can reach the soil present in the upper compartment since the strip (22) is also present in the upper compartment.

Also, according to this embodiment, the soil is never in contact with water because two or more lateral openings (23) which prevent the presence of too much water are provided as shown in FIG. 9. The latter openings (23) are formed at suitable level to permit the formation of an intermediate air chamber (24) from the level of the opening (23) up to the plate (16), plate (16) having openings. In this manner, it is possible to recycle air through the soil.

This embodiment permits to avoid the possibility of an excessive amount of water, or eventually rain to which the plants may be subjected, by causing excess water to drain from the soil and the vessel and the soil maintains a constant amount of moisture even under these conditions.

From what has been described and illustrated hereinabove, the novelty and the originality of the container and the novel vessel according to the invention are clear, particularly with respect to the automatic humidification of the soil which may continue also for a prolonged period of time and in the absence of human intervention.

It is clear also that in the production of the containers or the vessels according to the present invention, some modification may be carried out while maintaining the essential features because every modification in the production will fall within the scope of the present invention.

What is claimed is:

1. The combination of a container (1,10) and at least one vessel (4), said vessel containing soil (7) and flowers or a plant, said combination providing humidification of said flowers or plant both by evaporation and by capillary action, also providing recycling of air in said container and insulation from extreme temperature changes, said at least one vessel (4) having a bottom, said bottom having openings, said container having a bottom, said container having at the bottom thereof a predetermined amount of water (6), said water having a level, said level being lower than the bottom of said vessel, said container having means for supporting said vessel within said container above said level of said water, said combination comprising means for humidifying said soil in said vessel, said means comprising strips of felt (9), said strips being inserted in said soil contained in said vessel, through said openings in the bottom of said vessel, said strips also touching the bottom of said container and being immersed in said water whereby water is transferred due to capillary action to said soil (7), means for forming an air chamber within said container whereby air is recycled within said container and water evaporates in said air chamber and is absorbed by said soil, said air chamber also insulating said vessel from extreme temperature changes and said container is provided with a cylindrical tube (8) at the bottom thereof, said cylindrical tube having openings to allow water to flow to the outside of the container and to allow entry of air through said openings, said tube being open at the bottom and closed at the top thereof.

2. The combination according to claim 1 wherein said container has a border (2) and said vessel has border (5), said means for supporting said vessel within said container above the level of water consist of said border (2) of said container, said border (5) of said vessel, a plate (3) having a central opening, said plate (3) resting on said border of said container, said vessel going through said central opening of said plate, said border of said vessel having a diameter larger than said opening.

3. The combination according to claim 1 wherein said container has an upper border (2), said vessel has an upper border (5), said means for supporting said vessel within said container above the level of water consist of the upper border (5) of said vessel of diameter greater than said border (2) of said container whereby said vessel is held in said container above the level of water.

4. The combination according to claim 1 wherein said container (10) is adapted to contain a plurality of vessels and said vessels are supported by at least one plate (3), said plate (3) having openings different diameter and a plurality of vessels of different size are inserted in said container when said openings are of different diameter.

5. The combination according to claim 1 wherein said container has walls, said means for forming an air chamber within said container consist of said walls of said container, said plate (3), and the bottom of said vessel.

* * * * *